United States Patent [19]

Otala

[11] Patent Number: 6,154,208
[45] Date of Patent: *Nov. 28, 2000

[54] PROXY MECHANISM FOR NON-NATIVE GDI FORMATS

[75] Inventor: Tapani J. Otala, San Jose, Calif.

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/944,780

[22] Filed: Oct. 6, 1997

[51] Int. Cl.$^7$ ........................................ G06F 3/14
[52] U.S. Cl. .................. 345/335; 345/334; 707/501; 707/513; 707/901; 709/328
[58] Field of Search .................. 345/335, 334; 395/682, 683, 681, 500; 707/501, 513, 901

[56] References Cited

U.S. PATENT DOCUMENTS

| | | | |
|---|---|---|---|
| 5,299,018 | 3/1994 | Jefferson | 358/261.1 |
| 5,359,673 | 10/1994 | de La Beaujardiere | 382/40 |
| 5,602,974 | 2/1997 | Shaw et al. | 395/114 |
| 5,642,511 | 6/1997 | Chow et al. | 395/701 |
| 5,644,682 | 7/1997 | Weinberger et al. | 395/101 |
| 5,644,758 | 7/1997 | Patrick et al. | 395/525 |
| 5,706,457 | 1/1998 | Dwyer et al. | 345/349 |
| 5,760,916 | 6/1998 | Dellert et al. | 395/200.48 |
| 5,760,917 | 6/1998 | Sheridan | 358/442 |
| 5,831,639 | 11/1998 | Conticello | 345/511 |
| 5,857,199 | 1/1999 | Tamano et al. | 707/501 |
| 5,859,956 | 1/1999 | Sugiyama et al. | 395/501 |

OTHER PUBLICATIONS

Estman Kodak Company, Making Pictures as Easy as Words, Press Releases p. 1 of 1, Sep. 1997.
"How Does It Work?", FlashPix Primer (visited Sep. 5, 1997), Eastman Kodak Company, 1994–1997, <http://www.kodak.com/daiHome/flashPix/flashPixPrimer.shtml> (3 pages).
Flash Forward (visited Sep. 5, 1997), Eastman Kodak Company, 1994–1997, <http://www.kodak.com/daiHome/flashPix/flash Foward.shtml> (1 page).
"Connect Your Family", Kodak: FlashPix at Home (visited Sep. 5, 1997), Eastman Kodak Company, 1994–1997, <http://www.kodak.com/daiHome/flashPix/atHome.shtml> (2 pages).
"The FlashPix Format—Changing The Shape of Digital Imaging", Kodak:DRG—FlashPix2 (visited Sep. 5, 1997), Eastman Kodak Company, 1994–1997, <http://www.kodak.com/drgHome/productsTechnologies/FPX.shtml (3 pages).
"Who, What, Where, Why, How", FlashPix Frequently Asked Questions (visited Sep. 5, 1997), Eastman Kodak Company, 1994–1997, <http://www.kodak.com/daiHome/flashPix/flashPixFAQ.shtml> (3 pages).
"See For Yourself", Kodak: FlashPix Sample Pictures Index (visited Sep. 5, 1997), Eastman Kodak Company, 1994–1997, <http://www.kodak.com/daiHome/FlashPix/flashPixSamples.shtml> (1 page).
"FlashPix Format—Internet Imaging Protocol", Kodak: DRG—FlashPix2 (visited Sep. 12, 1997), Eastman Kodak Company, 1994–1997 (2 pages).
"FlashPix Format—Products & Technologies", Kodak Developer Relations Group—FlashPix Int . . . (visited Sep. 14, 1997), Eastman Kodak Company, 1994–1997.
"FlashPix Format—FlashPix Format Specification, Version 1.0.1", Jul. 10, 1997.

*Primary Examiner*—Raymond J. Bayerl
*Assistant Examiner*—Thomas T. Nguyen
*Attorney, Agent, or Firm*—Fitzpatrick, Cella, Harper & Scinto

[57] ABSTRACT

A system, for use with an operating system that includes an interface module which interfaces between an application program and a device driver, creates a proxy image in order to transmit information relating to an output image through the interface module. The system includes generating, in the application program, an output image having a first format which cannot be transmitted through the interface module, and creating a proxy image having a second format which can be transmitted through the interface module, the proxy image including information relating to the output image. The proxy image is then transmitted through the interface module to the device driver.

96 Claims, 7 Drawing Sheets

PROXY MECHANISM FOR NON-NATIVE GDI FORMATS

BACKGROUND OF THE INVENTION

1. Field of the Invention

The present invention is directed to a system which uses proxy images to store information relating to an output image generated by an application program, to transmit that information through an operating system interface module to a device driver, and to retrieve the output image.

2. Description of the Related Art

Modern personal computers include an operating system which allows a user to control computer functions and to execute application programs, such as WordPerfect, PowerPoint, etc. In addition to an operating system, modern computing systems also include one or more device drivers. Device drivers provide a software interface to firmware within an image forming device, such as a printer or display.

Traditionally, each application program included its own device drivers. Modern operating systems, such as Windows95, eliminate the need for this by providing a device driver which can operate with a variety of application programs. To achieve this advantage, operating systems of this type include one or more software modules which interface between application programs and the device driver. For example in a Windows95 environments, a graphics device interface (hereinafter "GDI") module is provided. This module processes images received from an application program, and outputs to the device driver images which are based on the images received from the application program.

To this end, the device driver includes one or more entry points, which correspond to an image format that is recognizable to the device driver, and which provide appropriate formatting (e.g., adding printer control commands and the like) to an image received from the interface module. For example, in a Windows95 device driver, one of these entry points is called StretchDIBits. This entry point is responsible for copying an image, formatted as a device independent bitmap (hereinafter "DIB") image, onto a rendering surface with optional stretching or shrinking.

Other than a device dependent bitmap (hereinafter "DDB"), the DIB is the only format available to transfer an image out of an application, through the GDI, to the device. Other formats are not recognizable by the GDI. Hence, for an application which works with images in other formats, such as FlashPix format, the application must convert the output image from the FlashPix format to an image format that is recognizable to the GDI, such as the DIB format noted above, in order to transmit the output image through the GDI. A second conversion may then required by the device driver in order to convert the DIB image into a format which can transmitted to the device by the device driver. These two conversions are time consuming, and, in some cases, data can be lost during the conversions.

Thus, there exists a need for a system which can transmit, to a device driver, information concerning an image which is output by an application program, and which has a format that is not native to the GDI.

SUMMARY OF THE INVENTION

The present invention addresses the foregoing needs by creating a proxy image having a format compatible with the GDI, but which is a proxy for a non-native image format, such as FlashPix. Using the foregoing example, a proxy DIB image is created for a FlashPix file, and the proxy DIB image is rendered by the GDI as if it were a native DIB format. At the device driver, flags in the proxy image alert the driver that it is receiving a proxy image rather than an actual DIB image, and the device driver consequently processes the proxy image as a FlashPix image and not as a DIB.

By virtue of this arrangement, it is possible to transmit, through an operating system interface module, information relating to an output image, which has a non-native format that cannot be transmitted through the operating system interface module, without performing conversions on the output image.

Thus, according to one aspect, the present invention is a method, for use with an operating system that includes an interface module which interfaces between an application program and a device driver, for creating a proxy image in order to transmit information relating to an image through the interface module. The method includes generating, in the application program, an output image having a first format which cannot be transmitted through the interface module, and creating a proxy image having a second format which can be transmitted through the interface module, the proxy image including information relating to the output image. The proxy image is then transmitted through the interface module to the device driver.

In preferred embodiments, between the generating and creating steps, the method includes providing information concerning one or more entry points of the device driver to the application program. In addition, in the creating step, the second format of the proxy image corresponds to an entry point of the device driver. By virtue of these features, it is possible to ensure that the proxy image has a format that the device driver supports.

In still other preferred embodiments, the proxy image includes one or more signature bits which are used to identify the proxy image as being a proxy image, a checksum which is used to verify the contents of the proxy image, and a header including a field which identifies a size of the information relating to the output image. By virtue of these features, modules in the device driver are able to recognize a proxy image, verify the contents of the proxy image, and access the information in the proxy image.

According to another aspect, the present invention is a method, for use with an operating system having an interface module that interfaces between an application program and a device driver, for retrieving an output image, generated by the application program, using a proxy image having a format that can be transmitted through the interface module. The method includes receiving, at the device driver, an image from the interface module, determining whether the received image is a proxy image, and extracting information relating to an output image from the received image in a case that the received image is a proxy image. The output image is then retrieved based on the information extracted in the extracting step.

By virtue of the foregoing features, the invention provides a way for determining whether a received image is a proxy image, and for handling the proxy image appropriately, i.e., by extracting information relating to an output image from the proxy image, and retrieving the output image based on the extracted information.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
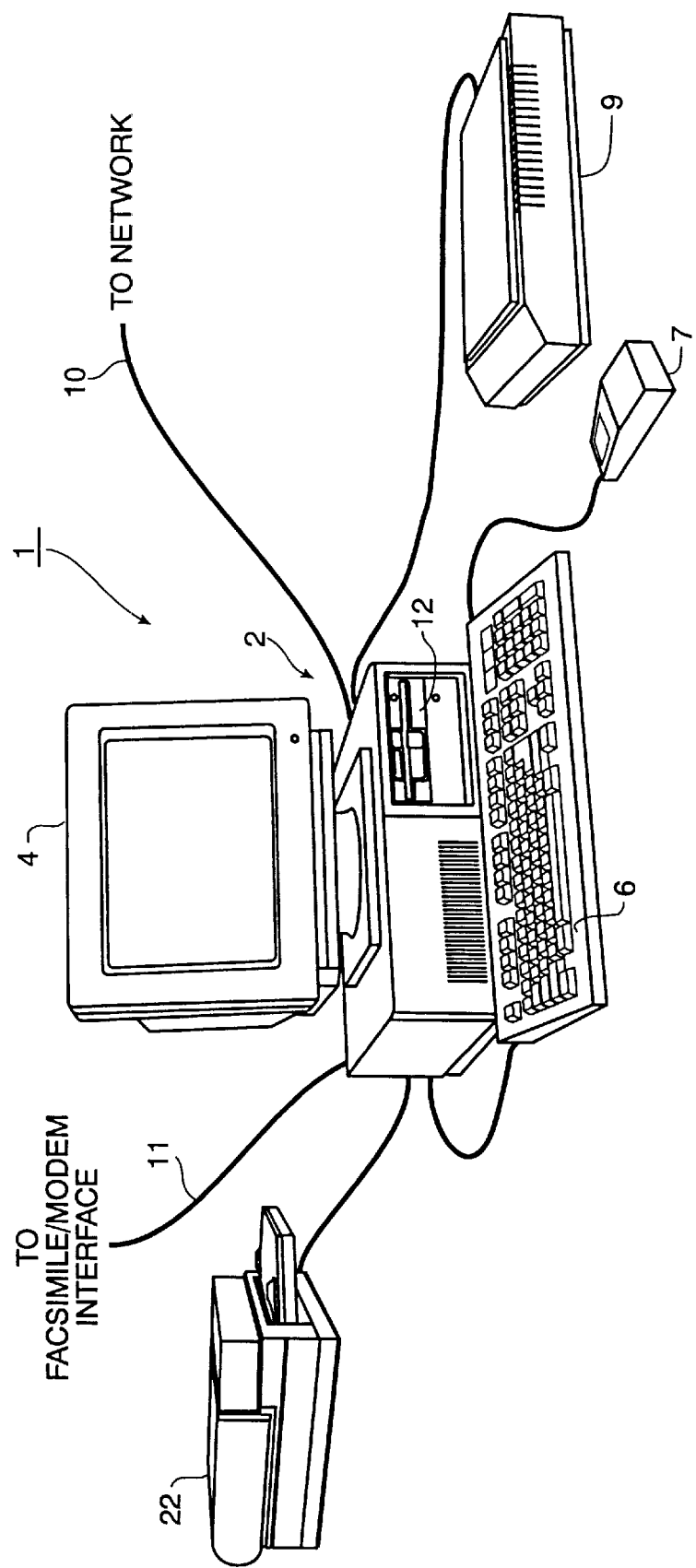
FIG. 1 is a perspective view of computing equipment used in the present invention.

FIG. 1 is a view showing the outward appearance of computing equipment used in a representative embodiment of the present invention. In the present invention, computing equipment 1 includes personal computer (hereinafter "PC") 2, which, in preferred embodiments of the invention, is an IBM PC-compatible computer having a windowing environment, such as Microsoft® Windows95.

Provided with computing equipment 1 are display screen 4 comprising a color monitor or the like, keyboard 6 for entering text data and user commands, pointing device 7 such as a mouse for pointing and for manipulating objects displayed on display screen 4, and scanner 9 for inputting image data. In addition, network interface 10 and facsimile/modem interface 11, also included with computing equipment 1, input image and/or text data from other sources, such as external hardware devices or the World Wide Web.

Figure 2:
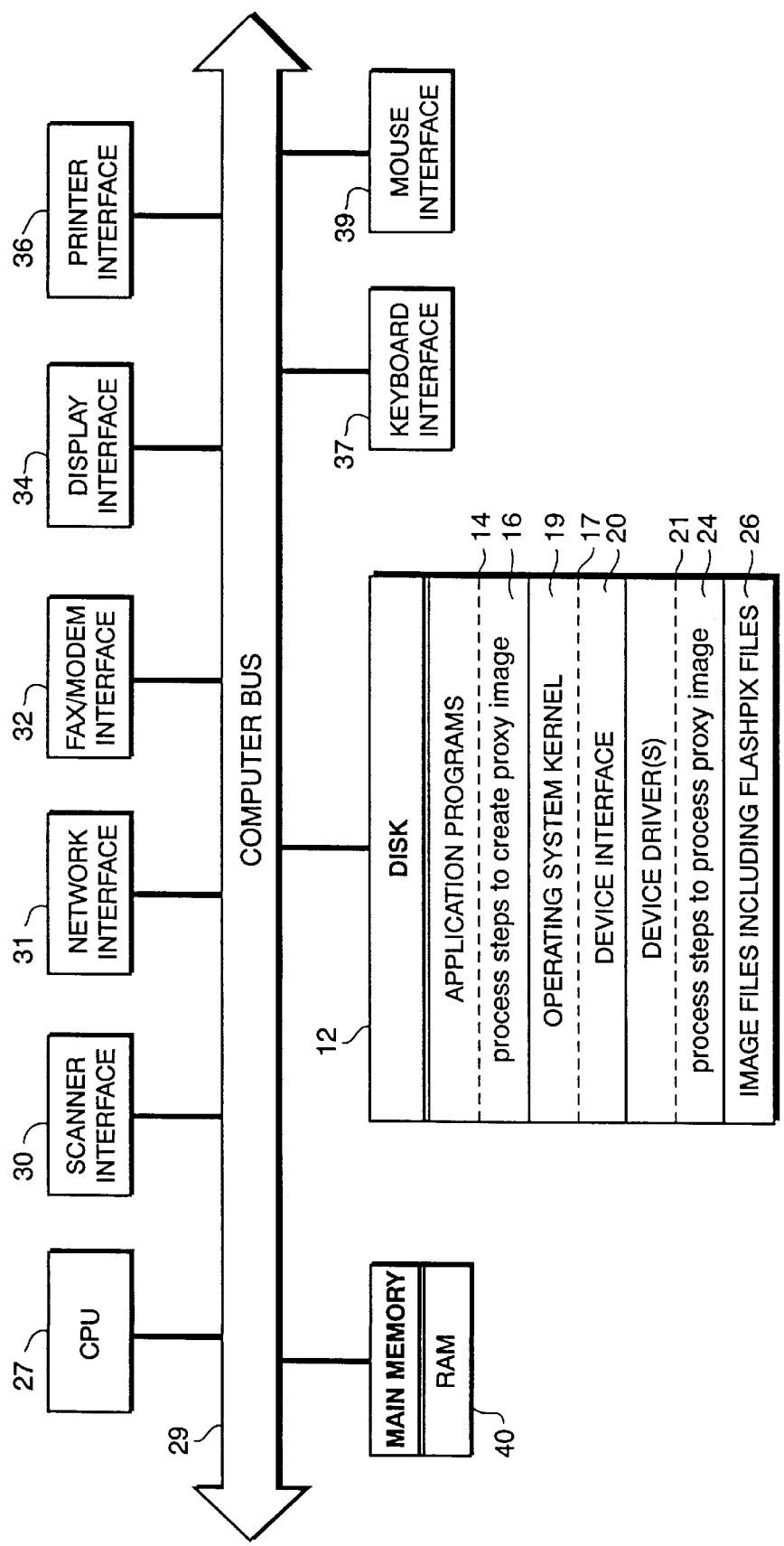
FIG. 2 shows the internal structure of the computing equipment shown in FIG. 1.

Computing equipment 1 includes a computer-readable memory medium, such as computer disk 12. As shown in FIG. 2, computer disk 12 stores application programs 14 by which computing equipment 1 generates files, manipulates and stores those files on disk 12, and presents data in those files to an operator via display screen 4. One or more of these application programs includes computer-executable process steps 16 which, when executed, create a proxy image in accordance with the present invention. Execution of these process steps is described in more detail below.

Figure 3:
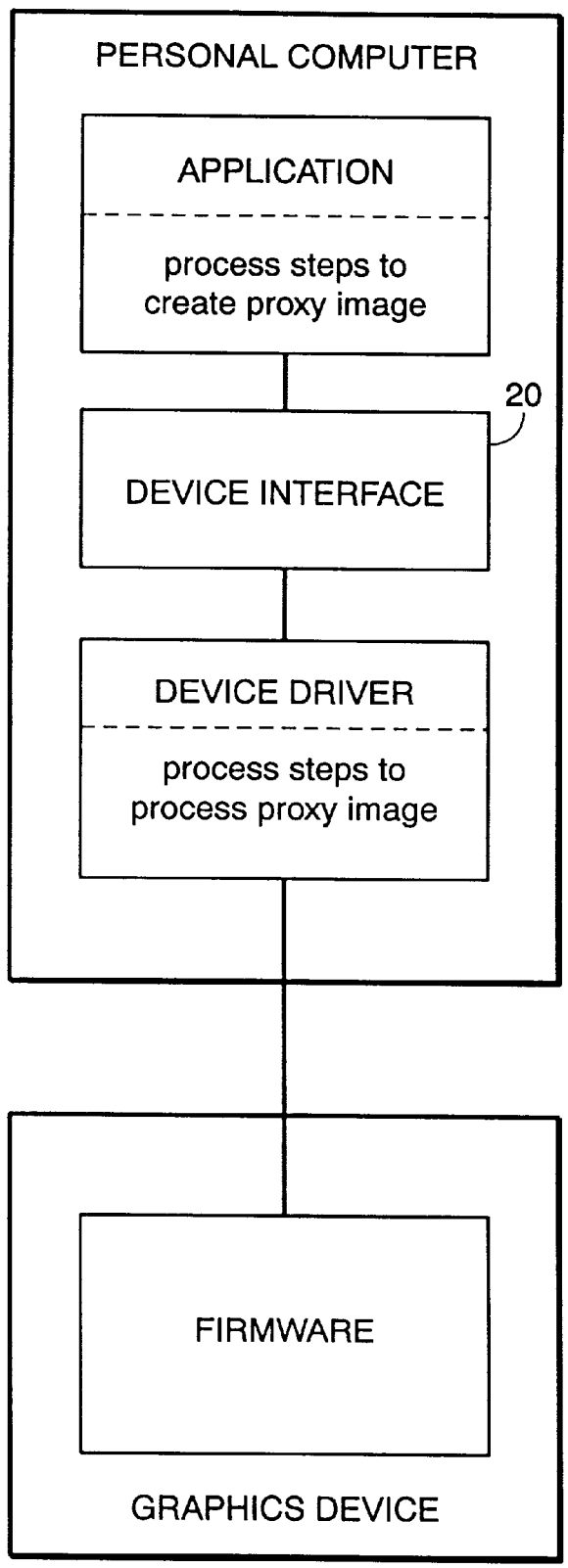
FIG. 3 shows the software architecture of a personal computer which includes the present invention and an installed graphics device.

Computer disk 12 also stores operating system 17, which in preferred embodiments of the invention is a windowing operating system, such as Windows95. As shown in FIG. 2, operating system 17 includes kernel 19 and device interface 20. In preferred embodiments of the invention, device interface 20 is the Windows95 GDI, which comprises a software module through which images are transmitted between application programs 14 and device drivers 21 also stored on computer disk 12. The relationship between device interface 20, an application program, and a device driver is shown in FIG. 3.

Device drivers 21 provide a software interface to firmware in an installed graphics device, such as printer 22 shown in FIG. 1. This relationship is also depicted graphically in FIG. 3. In the present invention, device drivers 21 comprise Windows95 device drivers, and also include computer-executable process steps 24 to identify and process a proxy image created by process steps 16 described above. Execution of these process steps is described in more detail below.

As noted above, files 26, which can be generated by application programs 14, are also stored on computer disk 12. Although these files can have a variety of different formats, the present invention will be described with respect to FlashPix-format files. It should be noted, however, that the invention is not limited to use with FlashPix files, and can be used with a variety of different file formats, such as AutoCAD drawings, PowerPoint presentations, Excel spreadsheets, QuickTime movies, etc.

As background, FlashPix-format files store data for an image as well as additional information relating to the image. Typically, Flashpix files store (1) the image in plural (e.g., four) different resolutions, (2) viewing parameters which comprise transformations and the like that affect how the image is displayed, and (3) information relating to the image, such as the date that the image was formed, etc. In addition, FlashPix files can also include an "extension list", to store additional (e.g., vendor-specific) information for an image. More information on the FlashPix format can be found in "FlashPix Format Specification", version 1.0.1 (1996, 1997), the contents of which are hereby incorporated by reference into the subject application.

FIG. 2 also shows the internal construction of computing equipment 1. As shown in FIG. 2, computing equipment 1 includes a central processing unit (hereinafter "CPU") 27 interfaced with computer bus 29. Also interfaced with computer bus 29 is scanner interface 30, network interface 31, fax/modem interface 32, display interface 34, printer interface 36, keyboard interface 37, pointing device (mouse) interface 39, main memory 40, and disk 12, which was described above.

Main memory 40 interfaces with computer bus 29 so as to provide random access memory (RAM) storage for use by CPU 27 when executing programs, such as application programs 14 noted above. More specifically, CPU 27 loads those application programs from disk 12 into main memory 40 and executes the stored programs out of main memory 40.

At this point, it should be noted that although a programmable general-purpose computer arrangement is shown in FIGS. 1 and 2, a dedicated or stand-alone computer, or other type of data processing equipment, can be used in the practice of the present invention.

Figure 4:
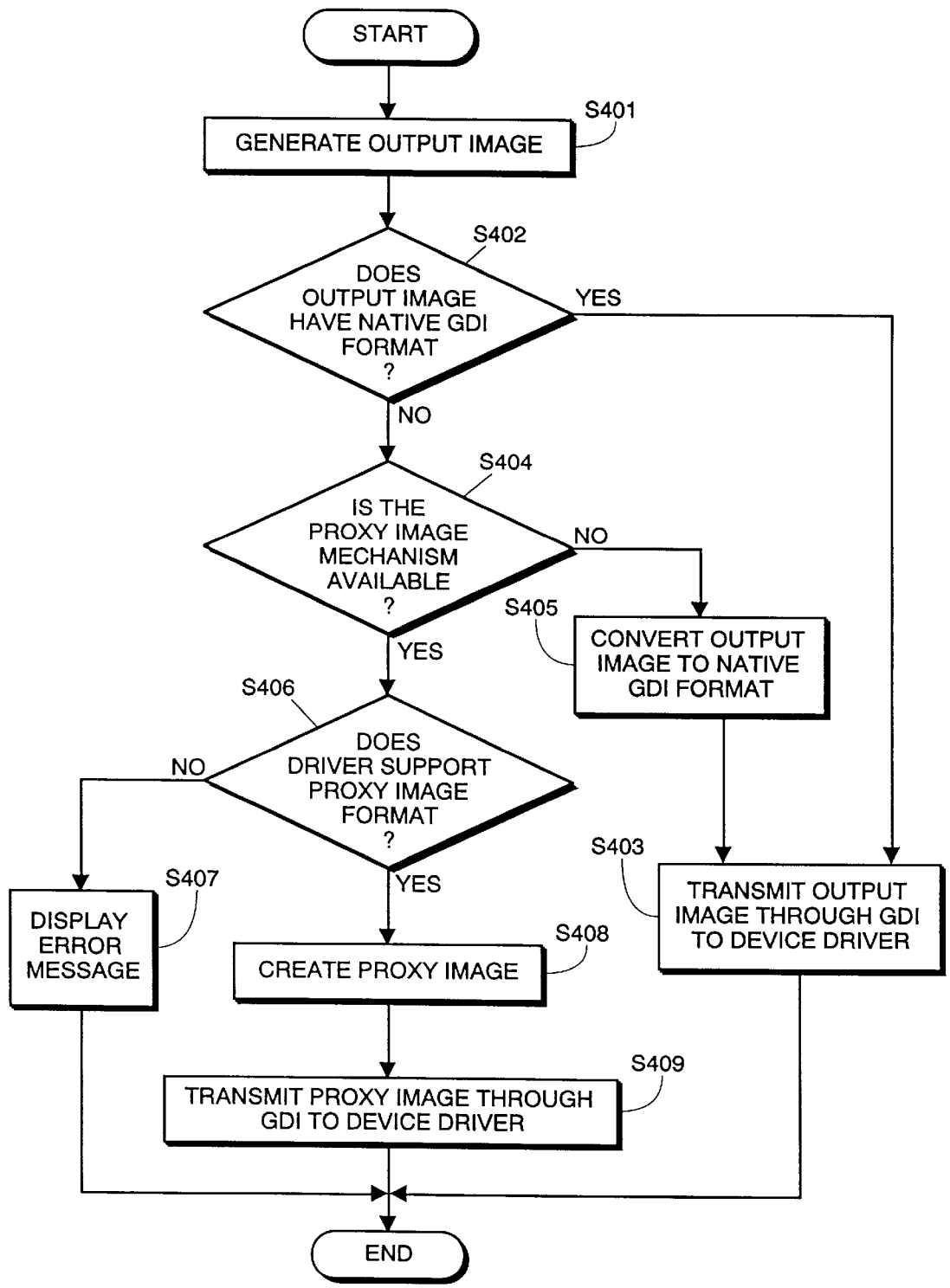
FIG. 4 is a flowchart showing process steps in an application program for processing output images in accordance with the present invention.

FIG. 4 shows a flow diagram of computer-executable process steps 16 for processing images in accordance with the proxy image mechanism of the present invention. The process steps shown in FIG. 4 are preferably included in an application program stored on disk 12. In preferred embodiments of the invention, these process steps are executed by CPU 27 out of main memory 40.

Briefly, process steps 16 are for use with an operating system that includes an interface module which interfaces between an application program and a device driver, and create a proxy image in order to transmit information relating to an output image through the interface module. Process steps 16 include code to generate, in the application program, an output image having a first format which cannot be transmitted through the interface module, and code to create a proxy image having a second format which can be transmitted through the interface module, the proxy image including information relating to the output image. Also included in process steps 16 is code to transmit the proxy image through the interface module to the device driver.

In more detail, step S401 is executed by an application program in order to generate an output image having a format, such as FlashPix, which is not native to GDI. More specifically, as noted above, GDI recognizes and can transmit DDB and DIB images, but cannot transmit images having non-native formats, such as FlashPix.

Following step S401, processing proceeds to step S402, which determines whether the format of the output image is a native GDI format like DDB or DIB, or a non-native GDI format like FlashPix. In a case that the format of the output image is a native GDI format, processing proceeds to step S403. Step S403 transmits the output image through the GDI, to the device driver, whereafter processing ends. However, in a case that the output image has a format, such as FlashPix, which is not native to GDI, processing proceeds to step S404.

Step S404 determines whether the proxy image mechanism of the present invention is available. To make this determination, step S404 checks the Windows registry for the presence of data indicating that the proxy image mechanism is available. Specifically, upon installation, a device driver adds data to the "HKEY$_{13}$LOCAL$_{13}$MACHINE" key in the Windows registry. This data indicates whether an installed device driver supports the a proxy image mechanism of the present invention. Step S405 therefore checks for the presence of this data to see if the proxy image mechanism of the present invention is available.

In a case that the proxy image mechanism is not available, processing proceeds to step S405. In step S405, a conversion is performed in order to change the format of the output image from a non-native GDI format to a native GDI format such as the DIB format. Thereafter, as shown in FIG. 4, processing proceeds to step S403, which transmits the format-converted output image through the GDI, to the device driver.

Returning to step S404, in a case that the proxy image mechanism is available, processing proceeds to step S406. Step S406 determines whether an installed device driver supports a potential proxy image format. Step S406 makes this determination by querying a device driver via the GDI in order to determine whether the device driver includes an entry point, such as StretchDIBits, which can receive the proxy image. In response to the query, the device driver provides to the application information concerning one or more entry points of the device driver. In preferred embodiments of the invention, the device driver provides one or more bit flags indicating whether or not a particular entry point or points is available in the driver. The application then determines, based on the received bit flags, whether the device driver supports the proxy image format. For example, in the preferred embodiment of the invention, the device driver returns a bit flag indicating that the StretchDIBits entry point is available, thereby confirming that the device driver supports the DIB (i.e., proxy image) format. By virtue of these features, the invention is able to determine if a particular device driver supports a current proxy image format.

In a case that step S406 determines that a particular device driver does not support the proxy image format, processing proceeds to step S407. Step S407 issues an error message, e.g., on display screen 4, indicating that the output image cannot be printed using a currently-installed device driver.

In a case that step S406 determines that the device driver supports the proxy image format, the present invention can include steps (1) to retrieve information concerning the output image, such as the size of the output image, and information concerning the device driver, such as a page size, and (2) to calculate destination information for the output image. This destination information corresponds, for example, to X-Y coordinates of a recording medium onto which the output image is to be printed, and may be used by the device driver in the manner described below during transmission of the output image to a graphics device.

Figure 5:
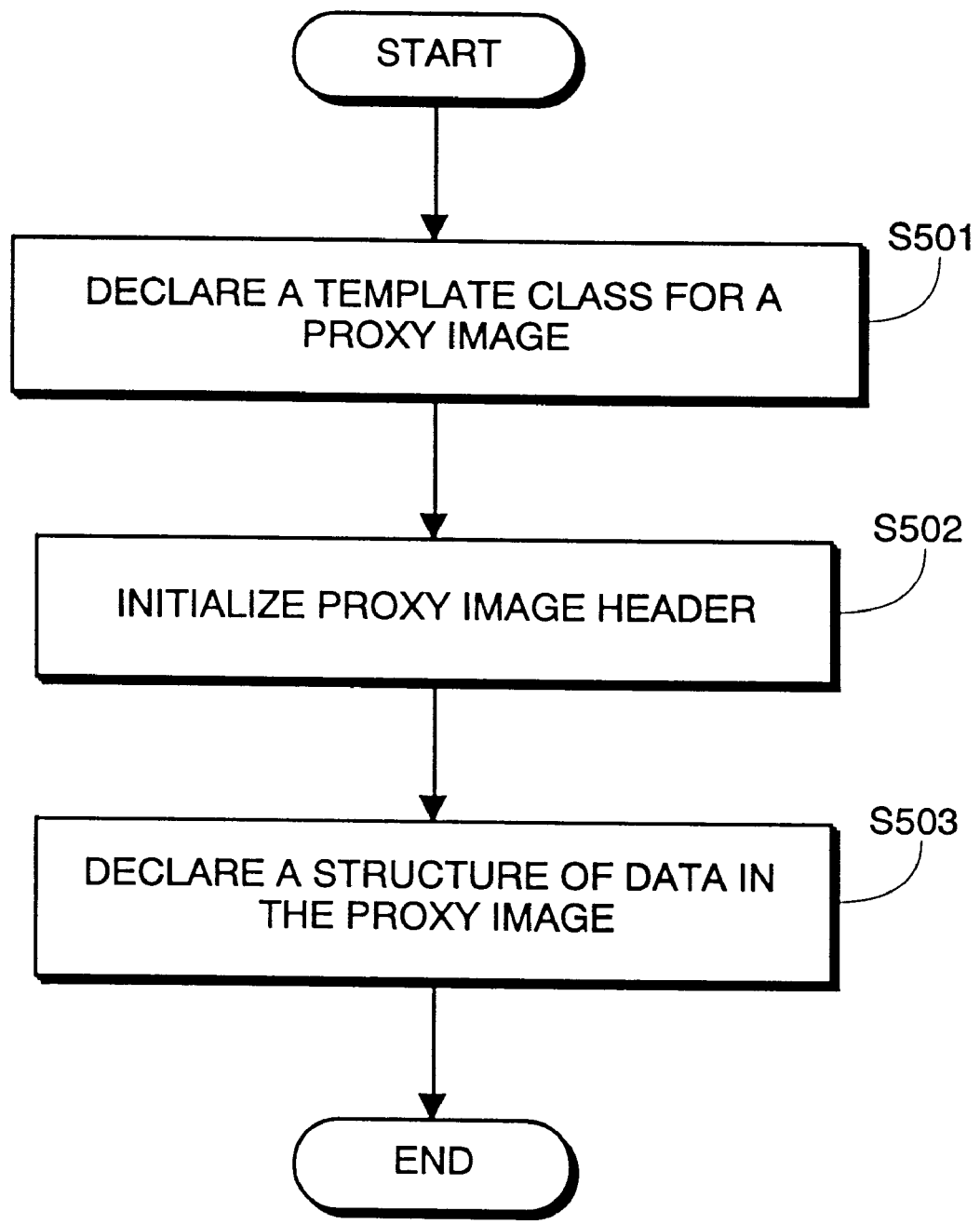
FIG. 5 is a flowchart showing process steps in an application program for creating a proxy image in accordance with the present invention.

Following step S406, processing proceeds to step S408, which creates a proxy image in order to transmit the output image having a non-native GDI format through GDI to the device driver. In this regard, FIG. 5 shows a flow diagram of computer-executable process steps to create a proxy image. The process steps shown in FIG. 5 are preferably included in an application program stored on disk 12. In preferred embodiments of the invention, these process steps are executed by CPU 27 out of main memory 40.

With reference to FIG. 5, step S501 declares a template class for packaging the proxy image. specifically, this step comprises selecting a template which includes the features of an image having a native GDI format. In preferred embodiments of the invention, this native GDI format is DIB. An example of a proxy image using a DIB format template is shown in FIG. 6.

Figure 6:
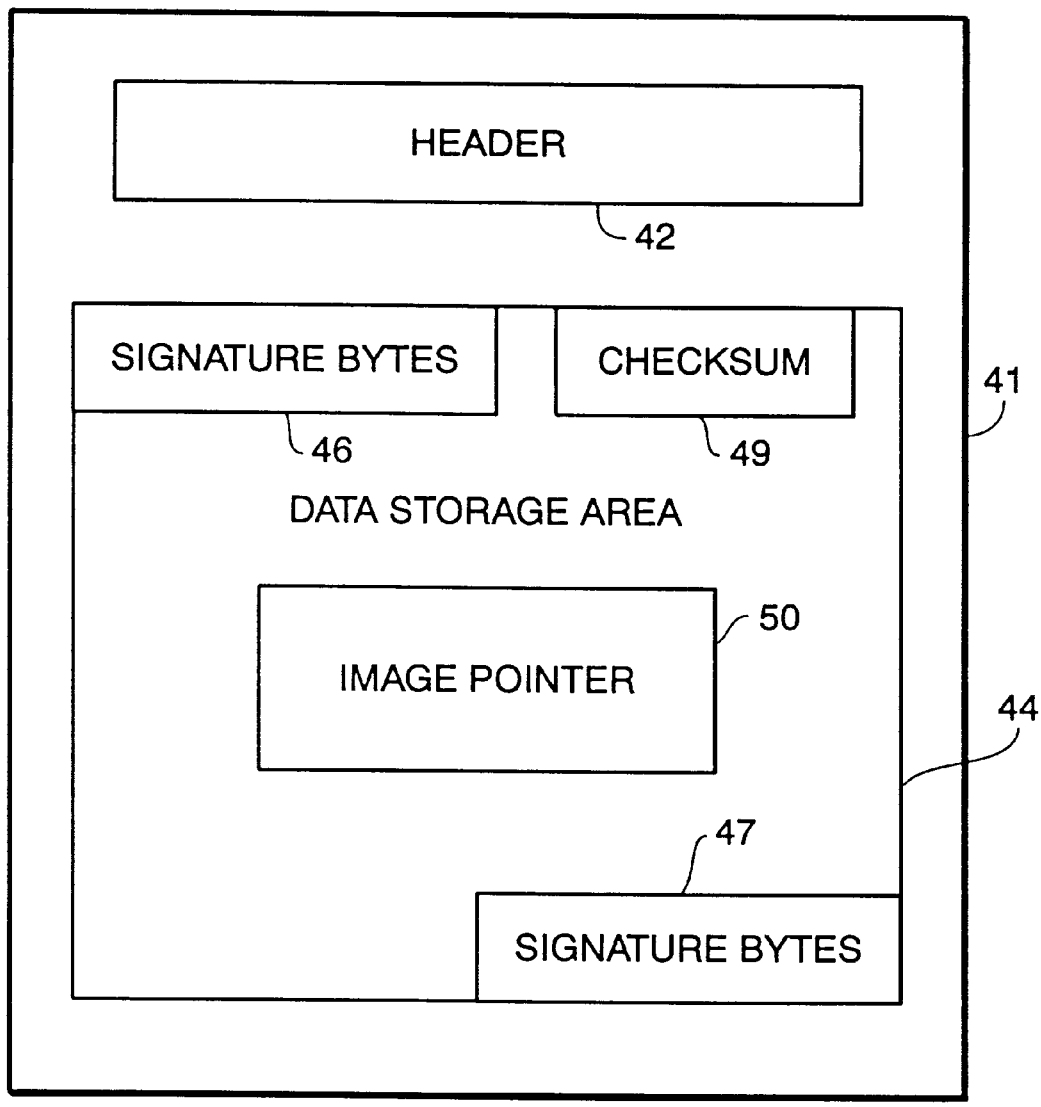
FIG. 6 shows a representative example of a proxy image having a DIB format.

As shown in FIG. 6, proxy image 41 includes, among other things, header 42 and data storage area 44. Header 42 is used by a program, such as a device driver, to recognize image 41 as being a DIB image, and is required by such programs to receive and process a DIB image. Header 42 includes a plurality of fields. In a proxy image, these fields must be present, but, in accordance with the present invention, most of the information in the these fields is ignored by a device driver that receives the proxy image. In fact, in preferred embodiments of the invention, the only field from the DIB header that is used is the biSizeImage field. With respect to standard DIB images, this field would have defined the size of data stored in the data storage area. In the present invention, this field is read by GDI in order to pass data stored in the data storage area of the proxy image through GDI to the device driver. Accordingly, step S502 comprises initializing the proxy image header, which in preferred embodiments of the invention is the DIB header. Specifically, step S502 stores, in the biSizeImage field, the size of the data to be stored in data storage area 44. Step S502 also stores holding values in the other fields of header 42.

Thereafter, step S503 declares a structure of data within the data storage area of a proxy image, such as that shown in FIG. 6. The data stored in the data storage area comprises information concerning the output image. This information includes image locators, such as image pointer 50 or the like, which can be used by the device driver to retrieve the output image from a storage location, as described in more detail below. For example, the structure can identify the output image as residing on a floppy disk, an area of disk 12, or the like. Alternatively, the structure could comprise a uniform resource locator (hereinafter "URL") in the case that the output image is to be accessed via the World Wide Web.

The structure declared in step S503 also includes signature bytes 46 and 47 at the beginning and end of data storage area 44, as shown in FIG. 6. As described below, these signature bytes are used by the device driver to identify an image received from GDI as being a proxy image. Also stored within data storage area 44 is checksum 49. Checksum 49 is used by a device driver to verify the proxy image, as described in more detail below. Following step S503, processing returns to FIG. 4, specifically to step S409 of FIG. 4.

Step S409 of FIG. 4 comprises transmitting the proxy image created in step S408 through GDI, to an entry point in the device driver, such as StretchDIBits. Because the proxy image is packaged as a DIB image, the proxy image is passed through GDI in the same manner as any other DIB image. Destination information, such as that described above, can also be transmitted through GDI to the device driver in step S409. This destination information may be used by the device driver to output the image, as described in detail below.

Figure 7:
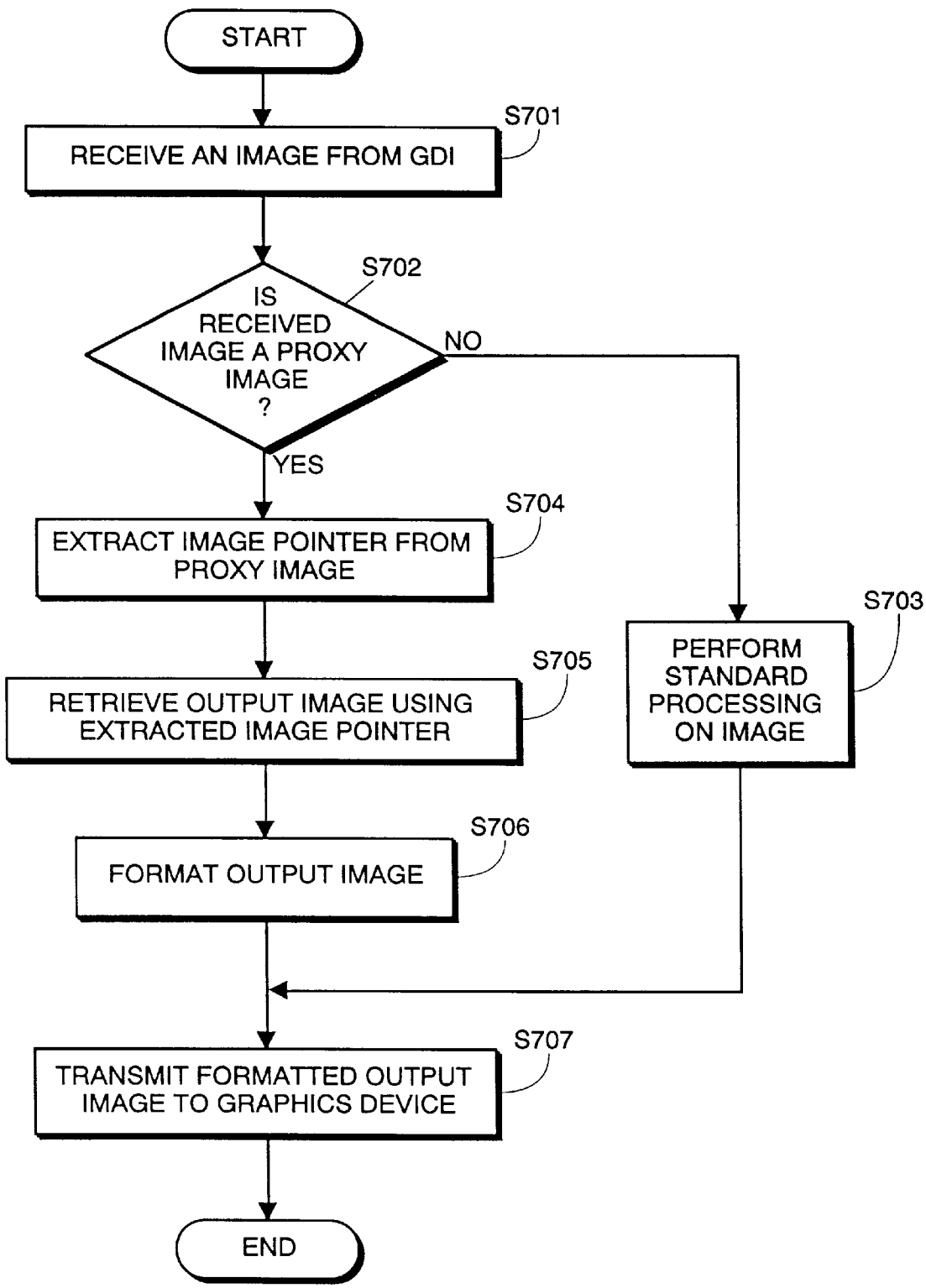
FIG. 7 is a flowchart showing process steps in a device driver for processing a proxy image received from an interface module, and for retrieving the output image using the proxy image.

FIG. 7 shows a flow diagram of computer-executable process steps 24, which are included within a device driver, to retrieve an output image identified by a proxy image received from an interface module, such as Windows GDI. The process steps shown in FIG. 7 are preferably stored on disk 12 in a device driver. In preferred embodiments of the invention, these process steps are executed by CPU 27 out of main memory 40.

Briefly, process steps 24 are for use with an operating system (e.g., Windows95) having an interface module (e.g., GDI) that interfaces between an application program and a device driver, for retrieving an output image generated by the application program using a proxy image having a format that can be transmitted through the interface module. Process steps 24 include code to receive, at the device driver, an image from the interface module, code to determine whether the received image is a proxy image, and code to extract information relating to an output image from the received image in a case that the received image is a proxy image. Code is also included to retrieve the output image based on the information extracted by the extracting code.

In detail, step S701 comprises receiving, at an entry point of a device driver, an image from the GDI. Destination information, such as that described above, for the image may also be received in this step. As noted above, in preferred embodiments of the present invention, the image received from GDI is a DIB-format image, and is received at the StretchDIBits entry point of the device driver. However, it should be noted that the invention is not limited to receiving a potential proxy image at the StretchDIBits entry point. Rather, the entry point at which a potential proxy image is received depends upon the format of the proxy image, and can vary depending upon the format of the proxy image.

Following step S701, step S702 determines whether the image received from GDI is a proxy image. More specifically, step S702 comprises reviewing data in the received image in order to determine whether the image is a proxy image. As noted above, in preferred embodiments of the invention, the image received from GDI has a DIB format. Accordingly, in these embodiments, step S702 comprises reviewing data stored in the data storage area of the received image for the presence of the above-described signature bytes. In a case that the signature bytes are present, step S702 then compares a checksum stored in the data storage area to a predetermined value. For an image to be classified as a proxy image, both signature bytes must be present in the image, and the checksum must be verified. In a case that the signature bytes are not present in the data storage area of the image or the checksum has not been verified, the image is determined not to be a proxy image. Therefore, processing proceeds to step S703.

In step S703, the device driver processes (e.g., formats) the image as a normal DIB image, rather than as a proxy image. Thereafter, the formatted image is output, in step S707, to a graphics device, such as a printer. Processing then ends.

In contrast, if step S702 determines that the signature bytes are present in the data storage area of the received image, and verifies the checksum, the received image is determined to be a proxy image. Accordingly, processing proceeds to step S704. Step S704 extracts image locators (e.g., pointers) from the proxy image. As noted above, in preferred embodiments of the invention, the image locators in the proxy image comprise one or more pointers to one or more FlashPix images stored in memory. As noted above, these pointers can correspond to memory addresses within computing equipment 1, such as disk 12, or to an external source, such as the World Wide Web.

Next, step S705 retrieves the output image using the one or more image locators extracted in step S704. In preferred embodiments of the invention, step S705 comprises retrieving a FlashPix image from a memory location, such as disk 12. Once the output image has been retrieved from memory, step S706 formats the output image for transmission to a graphics device, such as printer 22, using standard commands, such as those provided by the FlashPix software developers kit ("SDK"). In some embodiments of the invention, particularly those used with band printing systems, step S706 uses received destination information, such as that described above, to transmit the image, band-by-band, to the graphics device.

Following formatting in step S706, processing proceeds to step S707 in which the formatted output image is transmitted to the graphics device, where the image is formed, e.g., on a recording medium such as paper, on a display screen, etc.

The invention has been described with respect to a particular illustrative embodiment. It is to be understood that the invention is not limited to the above-described embodiment and that various changes and modifications may be made by those of ordinary skill in the art without departing from the spirit and scope of the appended claims.

What is claimed is:

1. A method, for use with an operating system that includes an interface module which interfaces between an application program and a device driver, for creating a proxy image in order to transmit information relating to an output image through the interface module, the method comprising the steps of:

generating, in the application program, an output image to be processed by the device driver, the output image having a first format which cannot be transmitted through the interface module;

creating a second image as a proxy of the output image, the proxy image having a second format which can be transmitted through the interface module, the proxy image including information relating to the output image; and transmitting the proxy image through the interface module to the device driver and foregoing transmission of the output image through the interface module.

2. A method according to claim 1, further comprising, between the generating and creating steps, the steps of:

providing information concerning one or more entry points of the device driver to the application program;

wherein, in the creating step, the second format of the proxy image corresponds to an entry point of the device driver.

3. A method according to claim 1, wherein the information relating to the output image in the proxy image comprises an address at which the output image is located.

4. A method according to claim 3, wherein the proxy image further comprises one or more signature bits which are used to identify the proxy image as being a proxy image, a checksum which is used to verify the contents of the proxy image, and a header including a field which identifies a size of the information relating to the output image.

5. A method according to claim 1, wherein the first format comprises a FlashPix image format, the second format comprises a device independent bitmap image format, and the interface module comprises a Windows graphics device interface.

6. A method according to claim 1, wherein the information relating to the output image is in the first format, wherein the interface module cannot interpret the information, and wherein the device driver can interpret the information.

7. A method, for use with an operating system having an interface module that interfaces between an application program and a device driver, for retrieving an output image generated by the application program using a proxy image having a format that can be transmitted through the interface module, the method comprising the steps of:

receiving, at the device driver, an image from the interface module;

determining whether the received image is a proxy for an output image that is to be processed by the device driver;

extracting information relating to the output image from the received image in a case that the received image is a proxy image; and retrieving the output image based on the information extracted in the extracting step wherein the output image is not received by the device driver via the interface module.

8. A method according to claim 7, wherein the determining step comprises inspecting the received image for the presence of one or more signature bits; and wherein, in a case that the one or more signature bits are present, the received image is determined to be a proxy image, and wherein in a case that the one or more signature bits are not present, the received image is determined not to be a proxy image.

9. A method according to claim 8, wherein the determining step further comprises verifying a checksum of the received image.

10. A method according to claim 7, wherein the information relating to the output image in the proxy image comprises an address of the output image; and wherein the extracting step comprises extracting the address of the output image from the proxy image and the retrieving step comprises retrieving the output image from the address.

11. A method according to claim 10, further comprising the steps of:

formatting the output image; and outputting the formatted output image to an image forming device.

12. A method according to claim 7, wherein the information relating to an output image is in the first format, and wherein the retrieved output image is in the first format.

13. An apparatus which runs an operating system that includes an interface module which interfaces between an application program and a device driver, and which creates a proxy image in order to transmit information relating to an output image through the interface module, the apparatus comprising:

a memory which stores the device driver, one or more application programs, and computer-executable process steps; and a processor which executes the device driver, the interface module, an application program, and the computer-executable process steps so that (1) the application program generates an output image having a first format which cannot be transmitted through the interface module, and (2) the computer-executable process steps create a second image as a proxy image of the output image, the proxy image having a second format which can be transmitted through the interface module, the proxy image including information relating to the output image, and transmit the proxy image through the interface module to the device driver and foregoing transmitting the output image through the interface module.

14. An apparatus according to claim 13, wherein the device driver provides information concerning one or more entry points of the device driver to the application program; and wherein the second format of the proxy image corresponds to an entry point of the device driver.

15. An apparatus according to claim 13, wherein the information relating to the output image in the proxy image comprises an address at which the output image is located.

16. An apparatus according to claim 15, wherein the proxy image further comprises one or more signature bits which are used to identify the proxy image as being a proxy image, a checksum which is used to verify the contents of the proxy image, and a header including a field which identifies a size of the information relating to the output image.

17. An apparatus according to claim 13, wherein the first format comprises a FlashPix image format, the second format comprises a device independent bitmap image format, and the interface module comprises a Windows graphics device interface.

18. An apparatus according to claim 13, wherein the information relating to the output image is in the first format, wherein the interface module cannot interpret the information, and wherein the device driver can interpret the information.

19. An apparatus which runs an operating system having an interface module that interfaces between an application program and a device driver, and which retrieves an output image, generated by the application program, using a proxy image having a format that can be transmitted through the interface module, the apparatus comprising:

a memory which stores the device driver and one or more application programs; and a processor which executes the device driver, the interface module, and an application program so that the device driver receives an image from the interface module, determines whether the received image is a proxy of an output image that is to be processed by the device driver, extracts information relating to an output image from the received image in a case that the image is a proxy image, and retrieves the output image based on the information which was extracted wherein the output image is not received by the device driver via the interface module.

20. An apparatus according to claim 19, wherein the device driver determines whether the received image is a proxy image by inspecting the received image for the presence of one or more signature bits; and wherein, in a case that the one or more signature bits are present, the received image is determined to be a proxy image, and wherein in a case that the one or more signature bits are not present, the received image is determined not to be a proxy image.

21. An apparatus according to claim 20, wherein the determining performed by the device driver further comprises verifying a checksum of the received image.

22. An apparatus according to claim 19, wherein the information relating to the output image in the proxy image comprises an address of the output image; and wherein the device driver retrieves the output image by extracting the address of the output image from the proxy image and retrieving the output image from the address.

23. An apparatus according to claim 22, wherein the processor executes the device driver so as to format the output image, and output the formatted output image to an image forming device.

24. An apparatus according to claim 19, wherein the information relating to an output image is in the first format, and wherein the retrieved output image is in the first format.

25. Computer executable process steps stored on a computer useable medium, the process steps for use with an operating system that includes an interface module which interfaces between an application program and a device driver, to create a proxy image in order to transmit information relating to an output image through the interface module, the computer-executable process steps comprising code to generate, in the application program, an output image to be processed by the device driver, the output image having a first format which cannot be transmitted through the interface module;

code to create a second image as a proxy of the output image, the proxy image having a second format which can be transmitted through the interface module, the proxy image including information relating to the output image; and code to transmit the proxy image through the interface module to the device driver and foregoing transmitting the output image through the interface module.

26. Computer-executable process steps according to claim 25, further comprising, between the code to generate and the code to create:

code to receive information concerning one or more entry points of the device driver in the application program;

wherein the second format of the proxy image corresponds to an entry point of the device driver.

27. Computer-executable process steps according to claim 25, wherein the information relating to the output image in the proxy image comprises an address at which the output image is located.

28. Computer-executable process steps according to claim 27, wherein the proxy image further comprises one or more signature bits which are used to identify the proxy image as being a proxy image, a checksum which is used to verify the contents of the proxy image, and a header including a field which identifies a size of the information relating to the output image.

29. Computer-executable process steps according to claim 25, wherein the first format comprises a FlashPix image format, the second format comprises a device independent bitmap image format, and the interface module comprises a Windows graphics device interface.

30. Computer-executable process steps according to claim 25, wherein the information relating to the output image is in the first format, wherein the interface module cannot interpret the information, and wherein the device driver can interpret the information.

31. Computer-executable process steps stored on a computer-readable medium, the computer executable process steps for use with an operating system having an interface module that interfaces between an application program and a device driver, to retrieve an output image generated by the application program using a proxy image having a format that can be transmitted through the interface module, the computer-executable process steps comprising:

code to receive, at the device driver, an image from the interface module;

code to determine whether the received image is a proxy of an output image that is to be processed by the device driver;

code to extract information relating to an output image from the received image in a case that the received image is a proxy image; and code to retrieve the output image based on the information extracted by the code to extract wherein the output image is not received via the interface module.

32. Computer-executable process steps according to claim 31, wherein the code to determine inspects the received image for the presence of one or more signature bits; and wherein, in a case that the one or more signature bits are present, the received image is determined to be a proxy image, and wherein in a case that the one or more signature bits are not present, the received image is determined not to be a proxy image.

33. Computer-executable process steps according to claim 32, wherein the code to determine comprises code to verify a checksum of the received image.

34. Computer-executable process steps according to claim 31, wherein the information relating to the output image in the proxy image comprises an address of the output image; and wherein the code to extract extracts the address of the output image from the proxy image and the code to retrieve retrieves the output image from the address.

35. Computer-executable process steps according to claim 34, further comprising:

code to format the output image; and code to output the formatted output image to an image forming device.

36. Computer-executable process steps according to claim 31, wherein the information relating to an output image is in the first format, and wherein the retrieved output image is in the first format.

37. A computer readable medium which stores computer executable process steps for use with an operating system that includes an interface module which interfaces between an application program and a device driver, the computer-executable process steps to create a proxy image in order to transmit information relating to an output image through the interface module, the computer-executable process steps comprising:

a generating step to generate, in the application program, an output image to be processed by the device driver, the output image having a first format which cannot be transmitted through the interface module;

a creating step to create a second image as a proxy of the output image, the proxy image having a second format which is recognizable by the interface module, the proxy image including information relating to the output image; and a transmitting step to transmit the proxy image through the interface module to the device driver and foregoing transmitting the output image through the interface module.

38. A computer-readable medium according to claim 37, further comprising, between the generating and creating steps:

a receiving step to receive information concerning one or more entry points of the device driver in the application program;

wherein, in the creating step, the second format of the proxy image corresponds to an entry point of the device driver.

39. A computer-readable medium according to claim 37, wherein the information relating to the output image in the proxy image comprises an address at which the output image is located.

40. A computer-readable medium according to claim 39, wherein the proxy image further comprises one or more, signature bits which are used to identify the proxy image as being a proxy image, a checksum which is used to verify the contents of the proxy image, and a header including a field which identifies a size of the information relating to the output image.

41. A computer-readable medium according to claim 37, wherein the first format comprises a FlashPix image format, the second format comprises a device independent bitmap image format, and the interface module comprises a Windows graphics device interface.

42. A computer-readable medium according to claim 37, wherein the information relating to the output image is in the first format, wherein the interface module cannot interpret the information, and wherein the device driver can interpret the information.

43. A computer-readable medium which stores computer-executable process steps for use with an operating system having an interface module that interfaces between an application program and a device driver, the computer-executable process steps to retrieve an output image generated by the application program using a proxy image having a format that can be transmitted through the interface module, the computer-executable process steps comprising:

a receiving step to receive, at the device driver, an image from the interface module;

a determining step to determine whether the received image is a proxy of an output image to be processed by the device driver;

an extracting step to extract information relating to an output image from the received image in a case that the received image is a proxy image; and a retrieving step to retrieve the output image based on the information extracted in the extracting step wherein the output image is not received via the interface module.

44. A computer-readable medium according to claim 43, wherein the determining step comprises inspecting the received image for the presence of one or more signature bits; and wherein, in a case that the one or more signature bits are present, the received image is determined to be a proxy image, and wherein in a case that the one or more signature bits are not present, the received image is determined not to be a proxy image.

45. A computer-readable medium according to claim 44, wherein the determining step comprises verifying a checksum of the received image in a case that the received image is a proxy image.

46. A computer-readable medium according to claim 43, wherein the information relating to the output image in the proxy image comprises an address of the output image; and wherein the extracting step comprises extracting the address of the output image from the proxy image and the retrieving step comprises retrieving the output image from the address.

47. A computer-readable medium according to claim 46, further comprising:

a formatting step to format the output image; and an outputting step to output the formatted output-image to an image forming device.

48. A computer-readable medium according to claim 43, wherein the information relating to an output image is in the first format, and wherein the retrieved output image is in the first format.

49. A data processing method in an application-program for outputting data to an operating system, the operating system including an interface module which interfaces between the application program and a device driver, the method comprising the steps of:

determining whether the device driver supports a proxy image mechanism for obtaining an output image based on a proxy image, the proxy image having information relating to the output image and having a format different from that of the output image;

creating the proxy image for the output image in a case that said determining step determines that the device driver supports the proxy image mechanism; and transmitting the proxy image through the interface module to the device driver so that the device driver can obtain the output image based on the proxy image.

50. A method according to claim 49, wherein the format of the proxy image corresponds to an entry point of the device driver.

51. A method according to claim 49, wherein the information relating to the output image in the proxy image comprises an address at which the output image is located.

52. A method according to claim 51, wherein the proxy image further comprises one or more signature bits which are used to identify the proxy image as being a proxy image, a checksum which is used to verify the contents of the proxy image, and a header including a field which identifies a size of the information relating to the output image.

53. A method according to claim 49, wherein a format of the output image comprises a FlashPix image format, the proxy image format comprises a device independent bitmap image format, and the interface module comprises a Windows graphics device interface.

54. A method according to claim 49, wherein the information relating to the output image is in a format which the interface module cannot interpret, and wherein the device driver can interpret the information.

55. A data processing method in a device driver configured to input data from an operating system and generate print data to be printed in a printer, the operating system including an interface module which interfaces between an application program and the device driver, the method comprising the steps of:

receiving data from the interface module;

determining whether the received data is a proxy image for an output image to be processed by the device driver; and extracting information relating to the output image from the received data in a case that the received image is a proxy image;

retrieving the output image based on the information extracted in the extracting step;

transmitting the print data including the output image to the printer; and wherein the output image is not received by the device driver via the interface module.

56. A method according to claim 55, wherein the determining step comprises inspecting the received image for a presence of one or more signature bits; and wherein, in a case that the one or more signature bits are present, the received data is determined to be a proxy image, and wherein in a case that the one or more signature bits are not present, the received data is determined not to be a proxy image.

57. A method according to claim 56, wherein the determining step further comprises verifying a checksum of the received data.

58. A method according to claim 55, wherein the information relating to the output image in the proxy image comprises an address of the output image; and wherein the extracting step comprises extracting the address of the output image from the proxy image and the retrieving step comprises retrieving the output image from the address.

59. A method according to claim 58, further comprising the steps of:

formatting the output image; and outputting the formatted output image to an image forming device.

60. A method according to claim 55, wherein the information relating to an output image is in a first format, and wherein the retrieved output image is in the first format.

61. An apparatus for outputting data to an operating system, the operating system including an interface module which interfaces between an application program and a device driver, the apparatus comprising:

memory which stores the device driver, one or more application programs, and computer-executable process steps; and a processor which executes the device driver, the interface module, the application program, and the computer-executable process steps (1) to determine whether the device driver supports a proxy image mechanism for obtaining an output image based on a proxy image, the proxy image having information relating to the output image and having a format different from that of the output image, (2) to create the proxy image for the output image in case a that said determining step determines that the device driver supports the proxy image mechanism, and (3) to transmit the proxy image through the interface module to the device driver so that the device driver can obtain the output image based on the proxy image.

62. An apparatus according to claim 61, wherein the format of the proxy image corresponds to an entry point of the device driver.

63. An apparatus according to claim 61, wherein the information relating to the output image in the proxy image comprises an address at which the output image is located.

64. An apparatus according to claim 63, wherein the proxy image further comprises one or more signature bits which are used to identify the proxy image as being a proxy image, a checksum which is used to verify the contents of the proxy image, and a header including a field which identifies a size of the information relating to the output image.

65. An apparatus according to claim 61, wherein a format of the output image comprises a FlashPix image format, the proxy image format comprises a device independent bitmap image format, and the interface module comprises a Windows graphics device interface.

66. An apparatus according to claim 61, wherein the information relating to the output image is in a format which the interface module cannot interpret, and wherein the device driver can interpret the information.

67. An apparatus for inputting data from an operating system and generating print data to be printed in a printer, the operating system including an interface module which interfaces between an application program and a device driver, the apparatus comprising:

memory which stores the device driver, one or more application programs, and computer-executable process steps; and a processor which executes the device driver, the interface module, the application program, and the computer-executable process steps so that the device driver (1) receives data from the interface module, (2) determines whether the received data is a proxy image for an output image to be processed by the device driver, (3) extracts information relating to the output image from the received data in a case that the received image is a proxy image, (4) retrieves the output image based on the information extracted in the extracting step, (5) transmits the print data including the output image to the printer, and wherein the output image is not received by the device driver via the interface module.

68. An apparatus according to claim 67, wherein the computer-executable process step to determine whether the received data is a proxy image comprises a computer-executable process step to inspect the received image for a presence of one or more signature bits; and wherein, in a case that the one or more signature bits are present, the received data is determined to be a proxy image, and wherein in a case that the one or more signature bits are not present, the received data is determined not to be a proxy image.

69. An apparatus according to claim 68, wherein the computer-executable process step to determine whether the received data is a proxy image comprises a computer-executable process step to verify a checksum of the received data.

70. An apparatus according to claim 67, wherein the information relating to the output image in the proxy image comprises an address of the output image; and wherein the computer-executable process step to extract comprises the computer-executable process step to extract the address of the output image from the proxy image and the computer-executable process step to retrieve comprises a computer-executable process step to retrieve the output image from the address.

71. An apparatus according to claim 70, wherein the apparatus further comprising computer-executable process steps to format the output image, and output the formatted output image to an image forming device.

72. An apparatus according to claim 67, wherein the information relating to an output image is in a first format, and wherein the retrieved output image is in the first format.

73. Computer-executable process steps stored on a computer usable medium, the process steps configured to output data to an operating system, the operating system including an interface module which interfaces between an application program and a device driver, the computer-executable process steps comprising:

code to determine whether the device driver supports a proxy image mechanism for obtaining an output image based on a proxy image, the proxy image having information relating to the output image and having a format different from that of the output image;

code to create the proxy image for the output image in a case that said determining step determines that the device driver supports the proxy image mechanism; and code to transmit the proxy image through the interface module to the device driver so that the device driver can obtain the output image based on the proxy image.

74. Computer-executable process steps according to claim 73, wherein the format of the proxy image corresponds to an entry point of the device driver.

75. Computer-executable process steps according to claim 73, wherein the information relating to the output image in the proxy image comprises an address at which the output image is located.

76. Computer-executable process steps according to claim 75, wherein the proxy image further comprises one or more signature bits which are used to identify the proxy image as being a proxy image, a checksum which is used to verify the contents of the proxy image, and a header including a field which identifies a size of the information relating to the output image.

77. Computer-executable process steps according to claim 73, wherein a format of the output image comprises a FlashPix image format, the proxy image format comprises a device independent bitmap image format, and the interface module comprises a Windows graphics device interface.

78. Computer-executable process steps to claim 73, wherein the information relating to the output image is in a format which the interface module cannot interpret, and wherein the device driver can interpret the information.

79. Computer-executable process steps stored on a computer usable medium, the process steps configured to input data from an operating system and generating print data to be printed in a printer, the operating system including an interface module which interfaces between an application program and a device driver, the computer-executable process steps comprising:

code to receive data from the interface module;

code to determine whether the received data is a proxy image for an output image to be processed by the device driver;

code to extract information relating to the output image from the received data in a case that the received image is a proxy image;

code to retrieve the output image based on the information extracted in the extracting step;

code to transmit the print data including the output image to the printer; and wherein the output image is not received by the device driver via the interface module.

80. Computer-executable process steps according to claim 79, wherein the code to determine whether the received image is a proxy image further comprises code to inspect the received image for a presence of one or more signature bits; and wherein, in a case that the one or more signature bits are present, the received data is determined to be a proxy image, and wherein in a case that the one or more signature bits are not present, the received data is determined not to be a proxy image.

81. Computer-executable process steps according to claim 80, wherein the code to determine whether the received image is a proxy image further comprises code to verify a checksum of the received data.

82. Computer-executable process steps according to claim 79, wherein the information relating to the output image in the proxy image comprises an address of the output image; and wherein the code to extract comprises code to extract the address of the output image from the proxy image and the code to retrieve comprises code to retrieve the output image from the address.

83. Computer-executable process steps according to claim 82, further comprising:

code to format the output image; and code to output the formatted output image to an image forming device.

84. Computer-executable process steps according to claim 79, wherein the information relating to an output image is in a first format, and wherein the retrieved output image is in the first format.

85. A computer-readable medium which stores computer-executable process steps configured to output data to an operating system, the operating system including an interface module which interfaces between an application program and a device driver, the computer-executable process steps comprising:

a determining step to determine whether the device driver supports a proxy image mechanism for obtaining an output image based on a proxy image, the proxy image having information relating to the output image and having a format different from that of the output image;

a creating step to create the proxy image for an output image in a case that said determining step determines that the device driver supports the proxy image mechanism; and a transmitting step to transmit the proxy image through the interface module to the device driver so that the device driver can obtain the output image based on the proxy image.

86. A computer-readable medium according to claim 85, wherein the format of the proxy image corresponds to an entry point of the device driver.

87. A computer-readable medium according to claim 85, wherein the information relating to the output image in the proxy image comprises an address at which the output image is located.

88. A computer-readable medium according to claim 87, wherein the proxy image further comprises one or more signature bits which are used to identify the proxy image as being a proxy image, a checksum which is used to verify the contents of the proxy image, and a header including a field which identifies a size of the information relating to the output image.

89. A computer-readable medium according to claim 85, wherein a format of the output image comprises a FlashPix image format, the proxy image format comprises a device independent bitmap image format, and the interface module comprises a Windows graphics device interface.

90. A computer-readable medium according to claim 85, wherein the information relating to the output image is in a format which the interface module cannot interpret, and wherein the device driver can interpret the information.

91. A computer-readable medium which stores computer-executable process steps configured to input data from an operating system and generating print data to be printed in a printer, the operating system including an interface module which interfaces between an application program and a device driver, the computer-executable process steps comprising:

a receiving step to receive data from the interface module;

a determining step to determine whether the received data is a proxy image for an output image to be processed by the device driver;

an extracting step to extract information relating to the output image from the received data in a case that the received image is a proxy image;

a retrieving step to retrieve the output image based on the information extracted in the extracting step;

a transmitting step to transmit the print data including the output image to the printer; and wherein the output image is not received by the device driver via the interface module.

92. A computer-readable medium according to claim 91, wherein the determining step comprises an inspecting step to inspect the received image for a presence of one or more signature bits; and wherein, in a case that the one or more signature bits are present, the received data is determined to be a proxy image, and wherein in a case that the one or more signature bits are not present, the received data is determined not to be a proxy image.

93. A computer-readable medium according to claim 92, wherein the determining step further comprises a verifying step to verify a checksum of the received data.

94. A computer-readable medium according to claim 91, wherein the information relating to the output image in the proxy image comprises an address of the output image; and wherein the extracting step comprises extracting the address of the output image from the proxy image and the retrieving step comprises retrieving the output image from the address.

95. A computer-readable medium according to claim 94, further comprising:

a formatting step to format the output image; and an outputting step to output the formatted output image to an image forming device.

96. A computer-readable medium according to claim 91, wherein the information relating to an output image is in a first format, and wherein the retrieved output image is in the first format.

\* \* \* \* \*

UNITED STATES PATENT AND TRADEMARK OFFICE
CERTIFICATE OF CORRECTION

PATENT NO. : 6,154,208
DATED : November 28, 2000
INVENTOR(S) : Tapani J. Otala

It is certified that error appears in the above-identified patent and that said Letters Patent is hereby corrected as shown below:

Column 1,
Line 53, "can" should read -- can be --.

Column 6,
Line 20, "specifically," should read -- Specifically, --.
Line 33, "the" (second occurrence) should be deleted.

Column 14,
Line 6, "output-image" should read -- output image --.

Column 15,
Line 44, "case a" should read -- a case --.

Signed and Sealed this

Thirtieth Day of October, 2001

Attest:

NICHOLAS P. GODICI
Attesting Officer   Acting Director of the United States Patent and Trademark Office